(12) United States Patent
Greer

(10) Patent No.: US 7,818,908 B2
(45) Date of Patent: Oct. 26, 2010

(54) BUSINESS FORM WITH DURABLE SELF LAMINATING WRISTBAND

(75) Inventor: Mark Greer, O'Fallon, MO (US)

(73) Assignee: Laser Band, LLC, St. Louis, MO (US)

( * ) Notice: Subject to any disclaimer, the term of this patent is extended or adjusted under 35 U.S.C. 154(b) by 155 days.

(21) Appl. No.: 11/735,078

(22) Filed: Apr. 13, 2007

(65) Prior Publication Data

US 2008/0250688 A1    Oct. 16, 2008

(51) Int. Cl.
G09F 3/14    (2006.01)
B41M 5/40    (2006.01)

(52) U.S. Cl. .......................... 40/633; 283/75

(58) Field of Classification Search ............... 40/633; 283/75; 428/40.1, 41.7, 41.8, 42.1, 42.2, 428/42.3, 43, 332, 334, 335, 336
See application file for complete search history.

(56) References Cited

U.S. PATENT DOCUMENTS

| | | | |
|---|---|---|---|
| 230,455 A | 7/1880 | Wilcox |
| 919,983 A | 4/1909 | Walsh |
| 922,948 A | 5/1909 | Portmore |
| 1,383,335 A | 7/1921 | Penksa |
| 1,517,456 A | 12/1924 | Pulliam |
| 2,054,227 A | 9/1936 | Nichols |
| 2,073,280 A | 3/1937 | Lederer |
| 2,553,676 A | 5/1951 | Roos |
| 2,641,074 A | 6/1953 | Richmond |
| 2,687,978 A | 8/1954 | Vogt |
| 3,153,869 A | 10/1964 | Twentier |
| 3,197,899 A | 8/1965 | Twentie |
| 3,402,808 A | 9/1968 | Yannuzzi |
| 3,517,802 A | 6/1970 | Petrie |
| 3,660,916 A | 5/1972 | McDermott et al. |
| 4,004,362 A | 1/1977 | Barbieri |
| 4,078,324 A | 3/1978 | Wiebe |
| 4,179,833 A | 12/1979 | Knodel |

(Continued)

FOREIGN PATENT DOCUMENTS

FR    2806594 A    9/2001

(Continued)

OTHER PUBLICATIONS

International Search Report for PCT/US2009/031979 dated Mar. 9, 2009.

(Continued)

Primary Examiner—Joanne Silbermann
(74) Attorney, Agent, or Firm—Thompson Coburn LLP

(57) ABSTRACT

A multi-layer business form comprises a top image receiving layer of coated polyester film, a bottom laminating layer of vinyl film, and a paper insulating layer adhered between these two layers so that the business form may be printed through a laser printer or other printer that employs elevated temperatures without fusing the film layers together. Die cuts in the business form define a self laminating wristband comprising a top imaging layer and a laminating layer which, after the form is printed, may be separated from the form along the die cuts, assembled by folding the laminating layer over the imaging layer to encapsulate it, and secured to a wearer's wrist with at least one adhesive coated tab extending from a side of the laminating layer.

29 Claims, 3 Drawing Sheets

U.S. PATENT DOCUMENTS

| | | | |
|---|---|---|---|
| 4,226,036 A | 10/1980 | Krug | |
| 4,370,370 A | 1/1983 | Iwata et al. | |
| 4,565,731 A * | 1/1986 | Komatsu et al. | 428/212 |
| 4,612,718 A | 9/1986 | Golub et al. | |
| 4,627,994 A | 12/1986 | Welsch | |
| 4,630,384 A | 12/1986 | Breen | |
| 4,682,431 A | 7/1987 | Kowalchuk et al. | |
| 4,696,843 A | 9/1987 | Schmidt | |
| 4,829,604 A | 5/1989 | Allen et al. | |
| 4,854,610 A | 8/1989 | Kwiatek | |
| 4,914,843 A | 4/1990 | DeWoskin | |
| 4,941,210 A | 7/1990 | Konucik | |
| 4,950,638 A | 8/1990 | Yuyama et al. | |
| 4,956,931 A | 9/1990 | Selke | |
| 4,978,144 A | 12/1990 | Schmidt et al. | |
| 4,991,337 A | 2/1991 | Solon | |
| RE33,616 E | 6/1991 | Welsch | |
| 5,026,084 A | 6/1991 | Pasfield | |
| 5,045,426 A | 9/1991 | Maierson et al. | |
| 5,135,789 A | 8/1992 | Schmidt | |
| 5,227,004 A | 7/1993 | Belger | |
| 5,227,209 A | 7/1993 | Garland | |
| 5,283,969 A | 2/1994 | Weiss | |
| 5,311,689 A | 5/1994 | Lindsey | |
| 5,318,326 A | 6/1994 | Garrison | |
| 5,351,993 A | 10/1994 | Wright et al. | |
| 5,370,420 A | 12/1994 | Khatib et al. | |
| 5,381,617 A | 1/1995 | Schwartztol et al. | |
| 5,383,686 A | 1/1995 | Laurash | |
| 5,418,026 A | 5/1995 | Dronzek, Jr. et al. | |
| 5,427,416 A | 6/1995 | Birch et al. | |
| 5,486,021 A | 1/1996 | Laurash | |
| 5,486,436 A | 1/1996 | Lakes | |
| 5,509,693 A | 4/1996 | Kohls | |
| 5,509,694 A | 4/1996 | Laurash et al. | |
| 5,518,787 A | 5/1996 | Konkol | |
| 5,524,934 A | 6/1996 | Schwan et al. | |
| 5,547,227 A | 8/1996 | Laurash et al. | |
| 5,560,657 A | 10/1996 | Morgan | |
| 5,586,788 A | 12/1996 | Laurash | |
| 5,595,404 A | 1/1997 | Skees | |
| 5,596,202 A | 1/1997 | Arakawa | |
| 5,598,970 A | 2/1997 | Mudry et al. | |
| 5,601,222 A | 2/1997 | Haddad | |
| 5,601,313 A | 2/1997 | Konkol et al. | |
| 5,630,627 A | 5/1997 | Stewart | |
| 5,637,369 A | 6/1997 | Stewart | |
| 5,648,143 A | 7/1997 | Mehta et al. | |
| 5,653,472 A | 8/1997 | Huddleston et al. | |
| 5,662,976 A | 9/1997 | Popat et al. | |
| 5,670,015 A | 9/1997 | Finestone et al. | |
| 5,687,903 A | 11/1997 | Akridge et al. | |
| 5,765,885 A | 6/1998 | Netto et al. | |
| 5,785,354 A | 7/1998 | Haas | |
| 5,842,722 A | 12/1998 | Carlson | |
| 5,877,742 A | 3/1999 | Klink | |
| 5,933,993 A | 8/1999 | Riley | |
| 5,984,363 A | 11/1999 | Dotson et al. | |
| 6,000,160 A | 12/1999 | Riley | |
| 6,006,460 A | 12/1999 | Blackmer | |
| 6,016,618 A | 1/2000 | Attia et al. | |
| 6,053,535 A | 4/2000 | Washburn et al. | |
| 6,055,756 A | 5/2000 | Aoki | |
| 6,067,739 A | 5/2000 | Riley | |
| 6,071,585 A | 6/2000 | Roth | |
| 6,092,321 A | 7/2000 | Cheng et al. | |
| 6,108,876 A | 8/2000 | Hubbert | |
| 6,155,476 A | 12/2000 | Fabel | |
| 6,155,603 A | 12/2000 | Fox | |
| 6,159,570 A | 12/2000 | Ulrich et al. | |
| 6,199,730 B1 | 3/2001 | Chisolm | |
| 6,303,539 B1 | 10/2001 | Kosarew | |
| 6,331,018 B1 | 12/2001 | Roth et al. | |
| 6,343,819 B1 | 2/2002 | Shiozaki | |
| 6,361,078 B1 | 3/2002 | Chess | |
| 6,409,871 B1 | 6/2002 | Washburn et al. | |
| 6,438,881 B1 | 8/2002 | Riley | |
| 6,510,634 B1 | 1/2003 | Riley | |
| 6,517,921 B2 | 2/2003 | Ulrich et al. | |
| 6,611,962 B2 | 9/2003 | Redwood et al. | |
| 6,641,048 B1 | 11/2003 | Schintz et al. | |
| 6,685,228 B2 | 2/2004 | Riley | |
| 6,748,687 B2 | 6/2004 | Riley | |
| 6,807,680 B2 | 10/2004 | Sloot | |
| 6,836,215 B1 | 12/2004 | Laurash et al. | |
| 6,863,311 B2 | 3/2005 | Riley | |
| 6,981,948 B2 | 1/2006 | Pellegrino et al. | |
| 7,017,293 B2 | 3/2006 | Riley | |
| 7,017,294 B2 | 3/2006 | Riley | |
| 7,047,682 B2 | 5/2006 | Riley | |
| 7,222,448 B2 | 5/2007 | Riley | |
| 7,523,576 B1 | 4/2009 | Petty | |
| 2002/0152928 A1 | 10/2002 | Lawandy et al. | |
| 2002/0176973 A1 | 11/2002 | Keiser | |
| 2003/0001381 A1 | 1/2003 | Riley | |
| 2003/0003249 A1 * | 1/2003 | Benim et al. | 428/35.7 |
| 2003/0011190 A1 | 1/2003 | Ryan | |
| 2004/0068906 A1 | 4/2004 | Riley | |
| 2004/0128892 A1 | 7/2004 | Valenti | |
| 2004/0244251 A1 | 12/2004 | Riley | |
| 2005/0091896 A1 | 5/2005 | Kotik et al. | |
| 2005/0108912 A1 | 5/2005 | Bekker | |
| 2005/0279001 A1 | 12/2005 | Riley | |
| 2005/0281989 A1 | 12/2005 | Finger | |
| 2006/0230661 A1 | 10/2006 | Bekker | |
| 2006/0236578 A1 | 10/2006 | Saint et al. | |
| 2006/0242875 A1 | 11/2006 | Wilson et al. | |
| 2006/0261958 A1 | 11/2006 | Klein | |
| 2007/0089342 A1 | 4/2007 | Jain et al. | |
| 2007/0120358 A1 | 5/2007 | Waggoner et al. | |
| 2007/0243361 A1 | 10/2007 | Riley et al. | |
| 2008/0098636 A1 | 5/2008 | Greer | |
| 2009/0094872 A1 | 4/2009 | Ali et al. | |
| 2009/0193701 A1 | 8/2009 | Greer | |
| 2009/0277061 A1 | 11/2009 | Jain et al. | |
| 2009/0282717 A1 | 11/2009 | Jain et al. | |
| 2010/0071241 A1 | 3/2010 | Jain et al. | |

FOREIGN PATENT DOCUMENTS

| | | |
|---|---|---|
| GB | 960859 | 6/1964 |
| GB | 2045718 | 11/1980 |
| GB | 2160492 | 12/1985 |
| GB | 2228915 A | 9/1990 |
| JP | 5-61777 | 8/1993 |
| JP | 08-190350 | 7/1996 |
| JP | 3032299 | 12/1996 |
| JP | 10-207374 | 8/1998 |
| JP | 11015383 A | 1/1999 |
| JP | 2001316921 A | 11/2001 |
| JP | 2002351321 A | 12/2002 |
| JP | 2003066849 | 3/2003 |
| JP | 2003157010 | 5/2003 |
| JP | 2003164307 | 6/2003 |
| JP | 2006039209 | 2/2006 |
| WO | 9502877 | 1/1995 |
| WO | 9612618 | 5/1996 |
| WO | 98/23081 | 5/1998 |
| WO | 99/18817 | 4/1999 |
| WO | 02/39412 | 5/2002 |
| WO | 03/003331 | 1/2003 |
| WO | 2004/028826 | 4/2004 |
| WO | 2005/064574 | 7/2005 |
| WO | 2006/007356 | 1/2006 |

| | | |
|---|---|---|
| WO | 2007/021375 | 2/2007 |
| WO | 2007/133906 | 11/2007 |
| WO | 2009099787 A1 | 8/2009 |
| WO | 2009/137195 | 11/2009 |

OTHER PUBLICATIONS

Office Action for U.S. Appl. No. 11/553891 dated Mar. 19, 2009.
ID Warehouse (http://web.archive.org/web/20050131235601/http://idwarehouse.com/) Jan. 31, 2005, p. 1: WB1908, Stock Vinyl Wristband.
Brochure entitled: "Integrated Document Management Software"; Smead Manufacturing Company; Date Unknown; Form No. SLI-95.
Catalog entitled: "Reseller Catalog Number One"; Smead Software Solutions ; Date Unknown; Form No. SSS-RC1-00.
Sample of Standard Register Labels.
Standard Register, P.S. Magazine, Fall 1998, Dayton, Ohio.
Gretchen Berry, "Wrist Watch," Advance for Healthcare Information Professionals, Feb. 15, 1999.
Sample of Standard Register Label.
"Yes, Sir, That's My Baby!," Material Management in Health Care, Feb. 1999, vol. 8, No. 2, Health Forum, Inc.
Disaster Management Systems, Inc., Triage Tag, Copyright 1996, Pomona, California.
Maryland Department of Transportation, Maryland Emergency Medical Services, Triage Tag, Copyright MIEMMS 1999, Maryland.
Posey Movable I.D. Bracelet; downloaded from http:/www.posey.com/products/4648.html on Aug. 18, 2004.
Avery Dennison DuraCard.
Avery Laminated Identification Cards #5361.
Brochure entitled: "Color-Barâ—Click Stripä Labeling System"; Smead Manufacturing Company; Date Unknown; Form No. SSS-CS-00.
Brochure entitled: "Color-Bar â Folders"; Smead Manufacturing Company; Date Unknown.
Office Action for U.S. Appl. No. 11/373,923 dated Jun. 1, 2009.
Office Action for U.S. Appl. No. 11/374,273 dated May 26, 2009.
Office Action for U.S. Appl. No. 11/562,114 dated May 6, 2009.
Office Action for U.S. Appl. No. 11/763,615 dated May 6, 2009.
International Preliminary Report on Patentability (Chapter II) for PCT/US2008/059616 dated Jul. 14, 2009.
International Search Report for PCT/US2009/039183 dated Jun. 25, 2009.
Office Action for U.S. Appl. No. 11/203,601 dated Aug. 17, 2009.
Office Action for U.S. Appl. No. 11/754,812 dated Jul. 24, 2009.
Office Action for U.S. Appl. No. 11/456,928 dated Jun. 15, 2009.
Office Action for U.S. Appl. No. 11/553,872 dated Jun. 17, 2009.
International Preliminary Report on Patenability (Chapter II) for PCT/US2009/031979 issued May 21, 2010.
International Preliminary Report on Patentability (Chapter II) for PCT/US2009/039183 issued Apr. 20, 2010.
International Preliminary Report of Patentability (Chapter I) for PCT/US2008/064972 dated Dec. 1, 2009.

* cited by examiner

BUSINESS FORM WITH DURABLE SELF LAMINATING WRISTBAND

BACKGROUND AND SUMMARY OF THE INVENTION

Business forms including self laminating wristbands are well known in the art, principally through the commercialization thereof by the assignee of the present invention who owns the rights to a number of issued patents on various different inventive designs and implementations thereof. Examples of such issued U.S. patents include: U.S. Pat. Nos. 5,933,993; 6,000,160; 6,067,739; 6,438,881; 6,510,634; 6,748,687; 7,017,293; 7,017,294; and 7,047,682; the disclosures of which are incorporated herein by reference. Even more wristband designs and inventions are disclosed in co-pending U.S. patent application Ser. No. 11/203,601, the disclosure of which is incorporated by reference. Many of these wristband inventions are presently being commercialized by the assignee hereof with great success in the US, with sales well in excess of millions of wristband forms annually.

The earliest design wristband disclosed in these US patent filings, representing the earliest design made and sold by the present assignee, is a self laminating wristband separable from a page sized business form and comprised generally of a paper imaging layer and a PET (polyester) laminating layer with both of said layers being of substantially the same length, with the PET (polyester) layer being about twice as wide for folding over and laminating the paper layer, and a pair of integrally formed tabs at the ends of the laminating layer for joining together and securing the wristband about the wearer's wrist. This wristband could be supplied alone in a sheetlet, or on a full size page along with a matrix of self adhering labels. A more detailed explanation of this design and its use is found in the patents identified above. This wristband design represents a significant improvement over the prior art and has met with great commercial success. Indeed, this wristband design remains a big seller today as noted above.

Later wristband designs were invented as shown in the patent filings mentioned above and even other patent filings, and also have achieved great commercial success. One such design includes an imaging area formed in a top layer of face stock, with a laminating layer adhered thereto, the laminating layer having a tail or strap portion extending to one side with a patch of adhesive at its end for insertion through a cinch slot formed opposite the strap and doubling back over itself to secure it about the wearer's wrist. With this wristband design a narrower, single layer strap is provided to achieve greater comfort, and it is believed that a more secure attachment is made with the mechanical interlocking of the strap with the cinch slot.

Yet another wristband design is similar to the second design with the difference being that instead of a single strap, a pair of straps are provided with one strap extending from each side of the laminated imaging area. In this design, the imaging area is more or less centrally positioned, and the wristband when worn resembles a wristwatch with an enlarged imaging area and narrower straps.

This wristband invention, including each of these three designs, has been targeted principally to the application of short term patient use, such as in outpatient medical facilities, although it has been found to perform beyond expectations for even longer term use. And, hospitals have been anxious to employ it for as many applications as possible due to its many advantages over other designs presently being marketed by the competition, including its low cost, ease of use and surprising longevity. Nevertheless, there remain a number of applications for which this elegant design and convenient use wristband was not intended but for which the healthcare industry has long felt a need.

In continuing the efforts to improve on the assignees designs and inventions, the inventor herein has succeeded in designing and developing a wristband which enjoys many of the same advantages of the earlier wristband designs, such as their ability to be conveniently processed through a laser printer, and which also exhibits an extended life even in the harsh environment of a hospital patient experiencing an extended stay. While similar in overall design and use, there are patentable distinctions in its construction. Simply put, this design comprises a coated polyester top or imaging layer separated from a strong but softer, vinyl laminating layer by an insulating paper layer which not only adds structure to the page sized form blank in which the wristband is die cut, but also substantially prevents the two film layers from fusing together as the form is passed through a laser printer or other printer employing elevated temperatures. Two layers of adhesive and a release layer comprise the rest of the form construction so that after the wristband, which is die cut into the page sized form, is separated therefrom it may be conveniently assembled and then secured about the wearer's wrist. This design may be readily adapted to each of the foregoing three previously patented designs.

The advantages of this wristband invention are many. The use of a coated polyester film as the imaging layer provides greater strength, and chemical and moisture resistance over using paper as in the previous designs. Yet the paper layer is kept, thereby making the polyester film simply an extra layer to provide even greater strength merely by having a greater number of layers. With the greater strength, a thicker, softer and more stretchable vinyl material may be used for the laminating layer which provides the advantage of minimizing the opportunity for sharp creases or corners to be formed along the length of the first wristband design, and which maintains the advantages of a single layer strap in the other designs. This softer, more stretchable vinyl also exhibits a longer life in use as it conforms and adheres more closely to the other layers comprising the laminated imaging area, thereby sealing better about the imaging layer and virtually eliminating points of weakness for moisture to seep in and breech the integrity of the wristband. Wearer comfort is also improved for the same reasons. No sharp creases or corners to scratch or scrape. The uniform layer thickness across the extent of the business form blank and laser printer compatibility are maintained, thereby allowing this design to be used with the same computer/printer systems presently installed and used for processing the assignees previous wristband designs. And, this design allows materials having greater flexibility, strength, and toughness to be used, thereby allowing for a wristband which enjoys an extended life over previous wristband designs. Thus, a hospital can expand its usage of these simple, convenient, and relatively inexpensive wristbands to patients anticipating an extended stay, and with a diminished expectation of having to replace a wristband subjected to harsh or extended use.

While the principal advantages and features of the durable and long life wristband of the present invention have been briefly explained, a fuller understanding may be attained through a careful review of the drawing figures and reading of the description of the preferred embodiments which follow.

DETAILED DESCRIPTION OF THE PREFERRED EMBODIMENT

Figure 1:
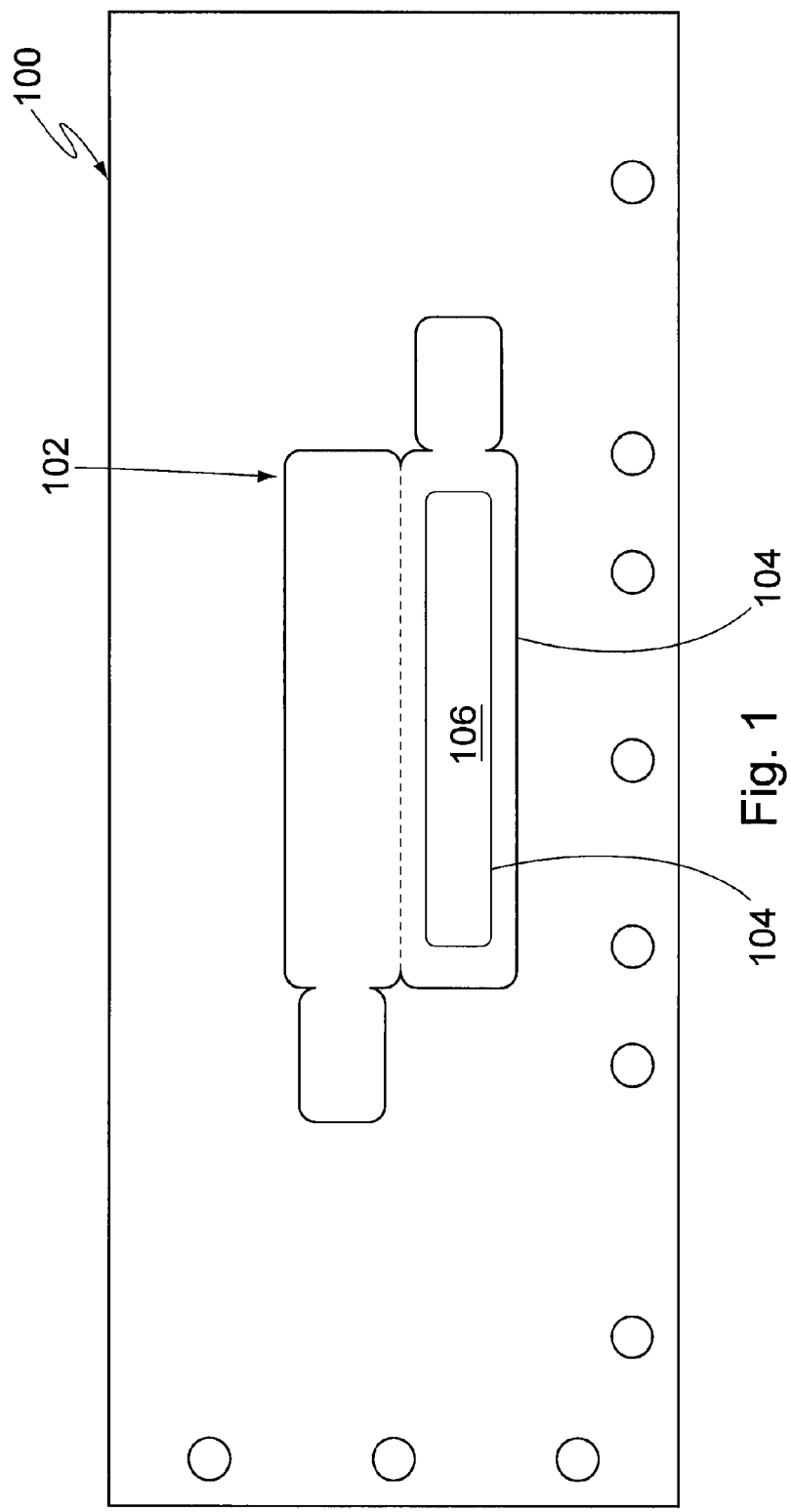
FIG. 1 is a plan view of a business form page with die cuts to form a wristband of the present invention implemented in a wristband design incorporating a full length imaging area.
Figure 2:
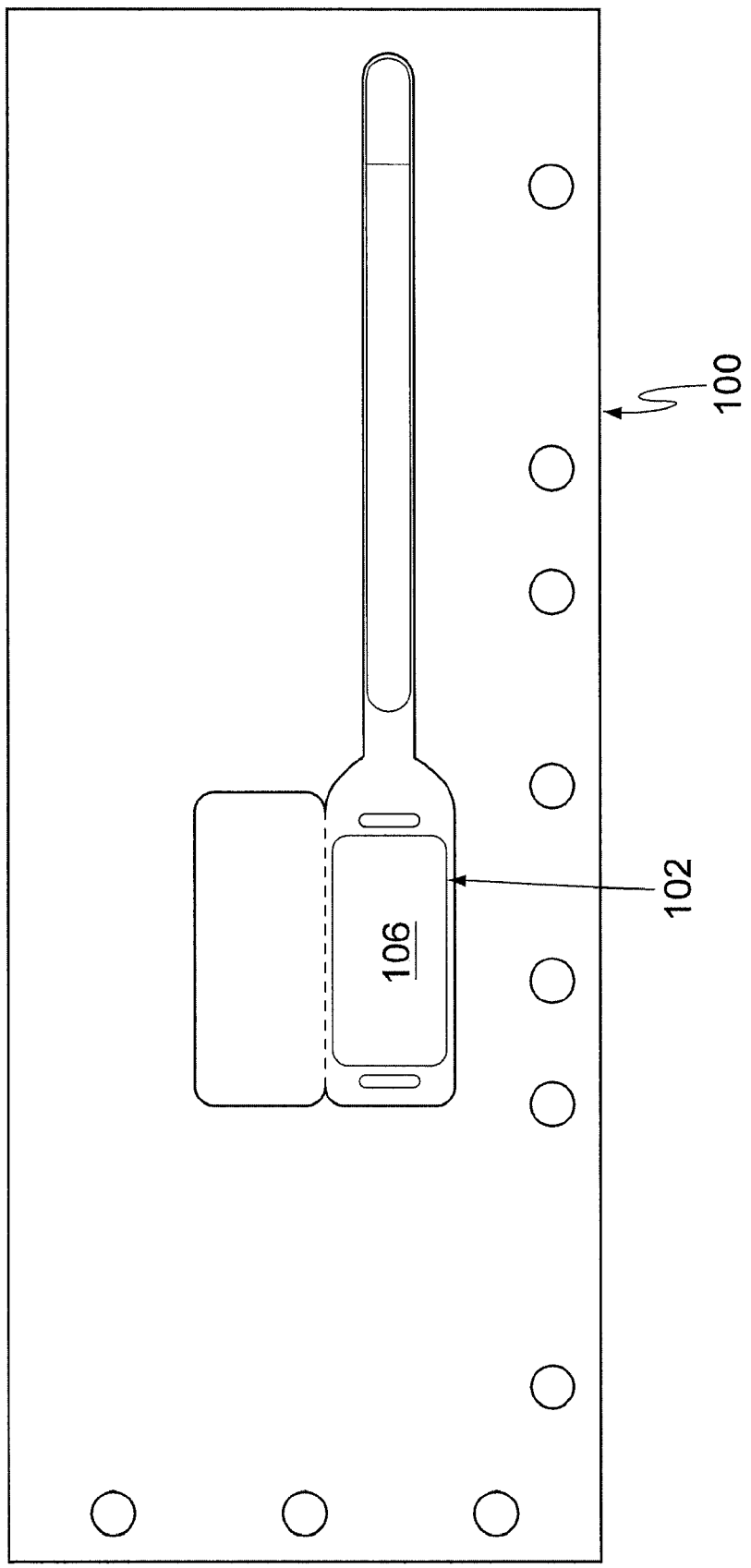
FIG. 2 is a plan view of a business form page with die cuts to form a wristband of an alternate embodiment of the present invention implemented in a wristband design incorporating a single strap extending to one side of the imaging area and a cinch slot through which the strap is inserted to secure the wristband.
Figure 3:
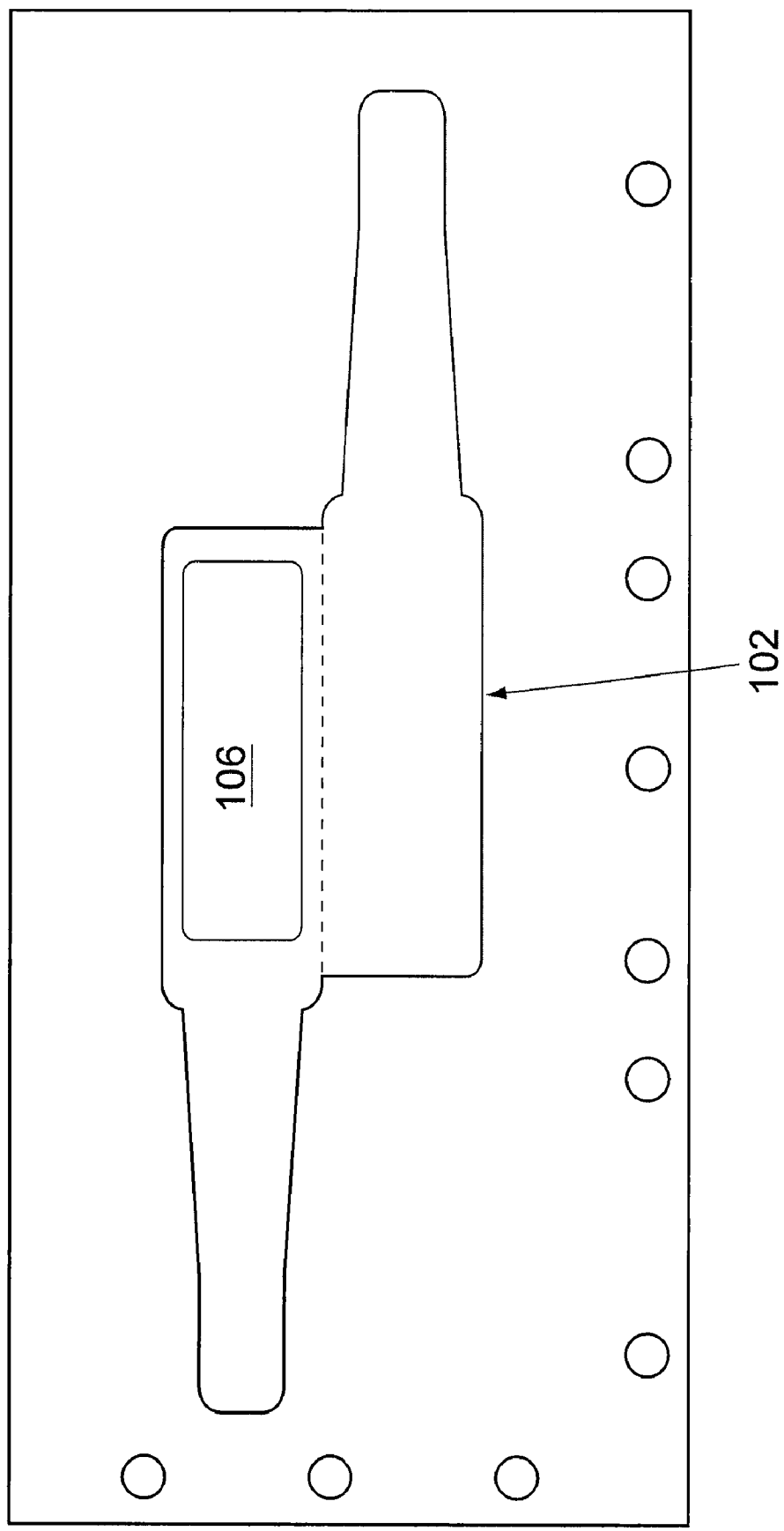
FIG. 3 is a plan view of a business form page with die cuts to form a wristband of yet another embodiment of the present invention implemented in a wristband design incorporating a pair of straps extending from opposite sides of the imaging area, with adhesive patches on the ends of the straps to secure the wristband.

The business form or blank 100, with the wristband 102 die cut therein, of the present invention are depicted in FIGS. 1 through 3 in the form as embodied in each of three prior wristband designs. While the invention is depicted for illustrative purposes in these three designs, it is intended that the same construction could be readily applied to other wristband designs and keep within the intended scope of the invention. The separation of previous wristband designs about their die cuts 104, and their assembly and use is explained extensively throughout the assignees issued patents identified above and incorporated herein by reference. As the separation, assembly, and use of the present wristband invention is essentially the same, no additional explanation thereof is believed necessary in order to make and use the invention as intended by the inventor as his preferred embodiment.

Figure 4:
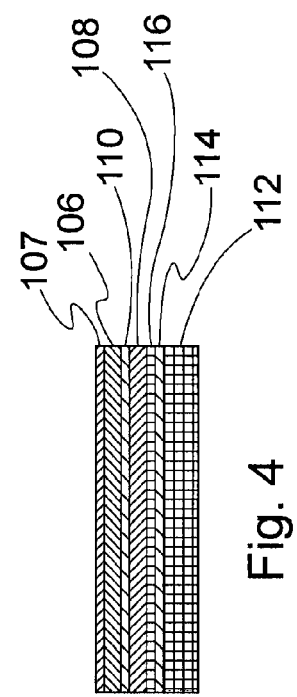
FIG. 4 is a cross-sectional view detailing the various layers forming the construction of the business form, and wristband imaging area, in FIG. 1.

As shown in FIG. 4, the business form or blank 100, and the wristband 102 of the present invention employs a multi-layer construction. A top or image receiving layer 106 is formed from a coated polyester film. The polyester film preferably used is one of a class of heat resistant films or foils as known in the art. The coating 107 used is preferably a laser print receptive coating such as one of a class of solvent, UV, or aqueous print receptive as known in the art. The image receiving layer 106 is preferably adhered to an insulating layer 108 with an adhesive 110, such as preferably pressure sensitive adhesives or a similar adhesive known in the art as suitable for processing through a high temperature printing process such as laser printing. In order to more securely adhere the wristband 102 for longer periods of time than with previous designs, a more aggressive adhesive is preferably used. The insulating layer 108 is preferably paper, such as common white bond with 20% fiber content or the like. A bottom, backing or laminate layer 112 is releasably adhered to the insulating layer 108 with a layer of adhesive 114 applied to the laminate layer 112 and a layer of release 116 applied to the insulating layer 108. This release layer 116 allows the wristband laminating layer 112 to be separated from the business form 100 and retain a layer of adhesive 114 as needed.

The preferable thicknesses of the layers is 2 mils for the coated polyester imaging layer and for the paper insulating layer, 4 mils for the laminate layer, and 1 mil each for the two layers of adhesive. The release layer is of minimal thickness, as is known in the art. Furthermore, a pattern for applying the adhesive and release layers may preferably be used to accommodate the creation of the desired elements of the wristband which either remain adhered or release as described, and all as completely explained in the assignees prior wristband patents. Other thicknesses may perform equally or almost as well, however the inventor has experimented with these thicknesses and they have been found to achieve the purposes of the invention. More particularly, business form pages of this construction have been found to sheet feed through a laser printer without fusing or jamming in the printer as they were being printed.

While this construction has been found to be especially desirable for creating durable, long wearing wristbands in a healthcare environment, the inventor contemplates that this same construction is readily adaptable to other applications intended for harsh environments including without limitation tags for military, marine, industrial, and other such uses.

While the principal advantages and features of the present invention have been disclosed and described herein, this disclosure is intended by the inventor to be merely illustrative of his preferred embodiments and not to be limiting in any way. Furthermore, there are changes and modifications that would be apparent to those of ordinary skill in the art after reading the inventors disclosure and those changes and modifications should be considered as within the teaching of the invention and scope of the claims. For example, as suggested above, while particular thicknesses of the various layers are taught as comprising the preferred embodiment, other thicknesses may also be used to like effect. Certain materials have been described and examples given, while other similar materials may be used to like effect, given their compliance with the teachings of the specification. A wristband example has been chosen for the preferred embodiment although other types of laminated tags, badges, etc. when fashioned from the same construction will likewise exhibit the features of the invention. Yet other changes and modifications would be apparent to those of skill in the art, and all should be considered as coming within the scope of the invention which should only be limited by the scope of the appended claims and their legal equivalents.

What is claimed is:

1. A business form with a self laminating wristband, said wristband having an image receiving layer and a laminating layer, each of said image receiving and laminating layers comprising films, and an insulating layer interposed therebetween so that said business form may be printed with a printing process employing elevated temperatures without fusing said two films together or to said insulating layer.

2. The business form of claim 1 wherein said image receiving layer comprises a layer of coated polyester, said insulating layer comprises a layer of paper, and further comprising a layer of adhesive joining said image receiving layer and said insulating layer.

3. The business form of claim 2 wherein said laminating layer comprises a vinyl laminate.

4. The business form of claim 3 wherein said laminating layer is approximately the same thickness as the combined thickness of the image receiving layer and the insulating layer.

5. The business form of claim 4 further comprising a layer of adhesive applied to said laminating layer and a release layer applied to said insulating layer so that upon separation of said laminating layer from said business form, the laminating layer retains at least portions of the adhesive layer.

6. The business form of claim 5 wherein said laminating layer and imaging layer are substantially the same length, and said laminating layer further comprising at least one integrally formed tab extending at an end thereof, said tab having a layer of adhesive for joining the wristband about a user's wrist upon separation of said wristband from said business form.

7. The business form of claim 5 further comprising a plurality of die cuts forming said wristband layers within said business form so that said wristband may be separated from said business form.

8. The business form of claim 7 wherein said laminating layer is sized to substantially encapsulate the imaging layer and thereby fully enclose it after separation of said wristband from said business form.

9. The business form of claim 4 wherein said laminating layer is approximately 4 mils thick.

10. The business form of claim 9 wherein said coated polyester layer is approximately 2 mils thick and said paper layer is approximately 2 mils thick.

11. The business form of claim 10 wherein said adhesive layers are each approximately 1 mil thick.

12. A form blank comprising a printable layer, a backing layer, and an insulating layer interposed therebetween, each of said printable and backing layers being comprised of films so that said insulating layer diminishes the likelihood of said films fusing to each other or to said insulating layer as said form blank is passed through a printer employing elevated temperatures.

13. The form blank of claim 12 wherein said insulating layer is paper and sized to be approximately 2 mils thick.

14. The form blank of claim 13 further comprising a first layer of adhesive between said printable layer and said insulating layer, and a second layer of adhesive between said backing layer and said insulating layer.

15. A durable self laminating wristband die cut into a multi-layered business form and separable therefrom along said die cuts, said wristband comprising an image receiving layer of polyester film, a laminating layer of vinyl film, and a paper insulating layer separating and adhered to each of said two film layers, said business form being configured for being printed by a printer employing elevated temperatures without fusing said film layers to said insulating layer.

16. The wristband of claim 15 wherein said laminating layer is sized to encapsulate the image receiving layer upon separation of said wristband from said business form.

17. The wristband of claim 16 wherein said image receiving layer is substantially the same length as said laminating layer.

18. The wristband of claim 16 wherein said laminating layer further comprises at least one integrally formed, adhesive coated tab extending from one end thereof for securing the wristband about a user's wrist.

19. The wristband of claim 18 wherein said wristband comprises an adhesive coated tab extending from both of the ends of said laminating layer.

20. The wristband of claim 19 further comprising a layer of adhesive applied to join the imaging layer to the insulating layer and a layer of adhesive applied to the laminating layer.

21. In a self laminating wristband die cut into a business form, said wristband comprised of an image receiving layer of polyester film, and a laminating layer comprised of a vinyl film, the improvement comprising an insulating layer separating and adhered to each of said film layers so that said wristband may be passed through and printed by a printer employing elevated temperatures without fusing the film layers together or to said insulating layer.

22. The wristband of claim 21 wherein said insulating layer is approximately 2 mils thick.

23. The wristband of claim 22 wherein said image receiving layer comprises a 2 mil thick coated polyester film and the laminating layer comprises a 4 mil thick vinyl film.

24. A business form page, said page comprising a top layer of a coated polyester film, a paper insulating layer joined to said top layer with a layer of adhesive, and a backing layer comprising a vinyl film releasably adhered to said paper layer with a layer of release and a layer of adhesive, said business form page being configured for receiving an image on said top layer by a printer employing elevated temperatures without fusing said top layer to said paper insulating layer.

25. The page of claim 24 further comprising a plurality of die cuts forming a multi-layer, self laminating wristband for separation from said page.

26. The page of claim 25 wherein said wristband comprises an imaging layer die cut from said top layer and a laminating layer die cut from said backing layer, said laminating layer including at least one tab for securing the wristband about a wearer's wrist.

27. The page of claim 26 wherein said imaging layer and said laminating layer are approximately the same length, disregarding the tab length.

28. A method for processing a business form page having a plurality of film layers separated by an insulating layer through a printer employing elevated temperatures without fusing the film layers together or to said insulating layer, the method comprising providing an insulating layer substantially coextensively between said film layers and adhered to each of said film layers.

29. The method of claim 28 wherein the providing step includes providing a paper insulating layer of approximately 2 mils in thickness.

* * * * *